United States Patent [19]
Baxter et al.

[11] Patent Number: 5,810,921
[45] Date of Patent: Sep. 22, 1998

[54] USE OF WASTE GLASS IN CONCRETE

[75] Inventors: Steven Z. Baxter, Brooklyn, N.Y.; Christian Meyer, Demarest, N.J.; Weihua Jin, Manhattan, N.Y.

[73] Assignee: The Trustees of Columbia University in the City of New York, New York, N.Y.

[21] Appl. No.: 810,558

[22] Filed: Mar. 3, 1997

[51] Int. Cl.$^6$ .................................................. C04B 14/22
[52] U.S. Cl. .......................... 106/711; 106/716; 106/737; 106/814
[58] Field of Search .................................. 106/711, 737, 106/814, 716

[56] References Cited

U.S. PATENT DOCUMENTS

| | | | |
|---|---|---|---|
| 3,823,021 | 7/1974 | Jansen | 106/716 |
| 4,002,482 | 1/1977 | Coenen | 501/33 |
| 4,062,689 | 12/1977 | Suzuki et al. | 106/711 |
| 4,090,882 | 5/1978 | Rauschenfels | 106/711 |
| 4,090,883 | 5/1978 | Rauschenfels | 106/711 |
| 4,090,884 | 5/1978 | Goeman | 106/711 |
| 4,115,135 | 9/1978 | Goeman et al. | 428/55 |
| 4,345,037 | 8/1982 | Fyles et al. | 106/711 |
| 4,534,796 | 8/1985 | Massol | 106/711 |
| 4,994,114 | 2/1991 | Thiery et al. | 106/713 |

FOREIGN PATENT DOCUMENTS

| | | |
|---|---|---|
| 9709282 | 3/1997 | WIPO . |

OTHER PUBLICATIONS

Samtur, "Glass Recycling and Reuse" IES Report 17, p. 69 (Mar. 1974).

Batalin, "Use of Waste Sheet and Bottle Glass For Making Devitrified Glass Concrete" *Glass and Ceramics*, pp. 510–513, 1992, no month.

Xu et al., "Effectiveness of Mineral Admixtures in Reducing ASR Expansion" Cement and Concrete Research, pp. 1225–1236, 1995, no month.

Reindl, "Recycling of Glass Cullet For Non–Container Uses" May 20, 1996.

ASTM Test C 1260–94, no date.

W.J. McCoy and A.G. Caldwell, "New Approach to Inhibiting Alkali–Aggregate Expansion", J.Am.Concrete Inst., vol. 22, pp. 693–706, May 1951.

D. Stark et al., "Eliminating or Minimizing Alkali–Silica Reactivity", Construction Technology Laboratories, Inc., Sidney Diamond, Purdue University, Strategic Highway Research Program, Washington, DC, SHRP–C–343, pp. 75–106, 1993, no date.

M. Pattengill and T.C. Shutt, "Use of Ground Glass as a Pozzolan", presented at the Albuquerque Symposium on Utilization of Waste Glass in Secondary Products, Jan. 24–25, 1973.

*Primary Examiner*—Anthony Green
*Attorney, Agent, or Firm*—Baker & Botts, L.L.P.

[57] ABSTRACT

The present invention relates generally to a glass formula for incorporation in glass-concrete compositions. The glass contains chromium. A detrimental reaction between the cement and the chromium glass and/or a reactive aggregate glass is suppressed in the set glass-concrete compositions.

24 Claims, 3 Drawing Sheets

USE OF WASTE GLASS IN CONCRETE

BACKGROUND OF THE INVENTION

The present invention relates generally to a concrete composition which comprises pieces of glass which act as a suppressant of a detrimental chemical reaction between reactive aggregate and cement. Alternatively, the pieces of glass suppress a detrimental chemical reaction between themselves and cement. Specifically, the present invention relates to a concrete composition having pieces of a glass which comprises chromium (hereinafter "chromium glass").

For several years, industry has sought effective methods for substituting waste glass into concrete. Effective methods for introducing waste glass into concrete are desired because they would provide a use for recycled waste glass.

It has proven to be difficult to effectively introduce waste glass into concrete because the cement in concrete typically undergoes a detrimental chemical reaction which causes degradation of the glass-concrete composition. Specifically, the cement matrix, which is alkaline, reacts with the waste glass aggregate, which contains silica. This chemical reaction is termed the "alkali-silica reaction" (hereinafter "ASR"). ASR may also result from a reaction between the cement matrix and silica-containing aggregate other than the added glass. If unchecked, this reaction causes expansion and cracking of the concrete.

It has also proven difficult to successfully introduce into concrete certain aggregates which do not contain silica because they may also participate in detrimental chemical reactions with the cement matrix.

Researchers have made several attempts to reduce or prevent problems associated with ASR. For example, U.S. Pat. No. 4,347,037 to Fyles et al. (hereinafter "Fyles") discloses alkali-resistant glass fibers for use as reinforcement in concrete articles. The glass fibers disclosed in Fyles comprise 6 to 22% zirconium oxide and 0.1 to 1% chromium oxide. Alkali-resistant glass fibers comprising calcium oxide and zirconium oxide are also known. Such fibers have proven to be somewhat successful in avoiding ASR. However, these fibers are disadvantageous because they must contain a relatively high amount of zirconium, which is costly.

For the foregoing reasons, there is a need for an effective, inexpensive glass-concrete composition which avoids degradation due to a detrimental chemical reaction.

Accordingly, it is an object of the invention to provide a set glass-concrete composition with dispersed glass particles wherein the glass particles do not undergo a detrimental chemical reaction within the concrete.

Another object of the invention is to provide a set glass-concrete composition wherein the glass particles or fibers act to suppress a detrimental chemical reaction in the concrete.

Another object of the invention is to provide a glass fiber-reinforced concrete composition wherein said glass fibers do not contain levels of zirconium which are sufficiently high to impart enhanced alkali-resistant properties to the glass fibers.

Yet another object of the invention is to provide a process for making a set glass-concrete composition wherein ASR is supresssed within the concrete.

SUMMARY OF THE INVENTION

These, and other objects of the invention are obtained by providing a set glass-concrete composition which does not possess the shortcomings of the prior art and offers the advantages of providing a glass-concrete composition which successfully incorporates inexpensive recycled glass. Specifically, the objects of the invention are obtained by incorporating chromium glass particles dispersed in concrete. These chromium glass particles do not contain levels of zirconium which are sufficiently high to impart alkali-resistant properties to the glass. However, zirconium need not be intentionally removed, and therefore the chromium glass particles used in the set glass-concrete composition may contain trace amounts of zirconium. The chromium glass may be ordinary green bottle glass.

Further objects of the invention are obtained by providing a chromium glass fiber-reinforced concrete composition wherein the glass fibers comprise chromium glass, but do not contain an amount of zirconium which is sufficient to impart significantly enhanced alkali resistant properties to the glass fiber. The chromium glass fiber is advantageous because ordinary fibers may cause ASR in the concrete, and therefore will not function as an effective reinforcement for concrete compositions. However, the chromium glass avoids ASR. Moreover, the chromium glass fiber is superior to alkali-resistant glasses which contain high levels of zirconium because such glasses are relatively costly.

These and other features, aspects and advantages of the present invention will become better understood with reference to the following description and the appended claims and accompanying drawings.

DETAILED DESCRIPTION OF THE INVENTION

Figure 1:
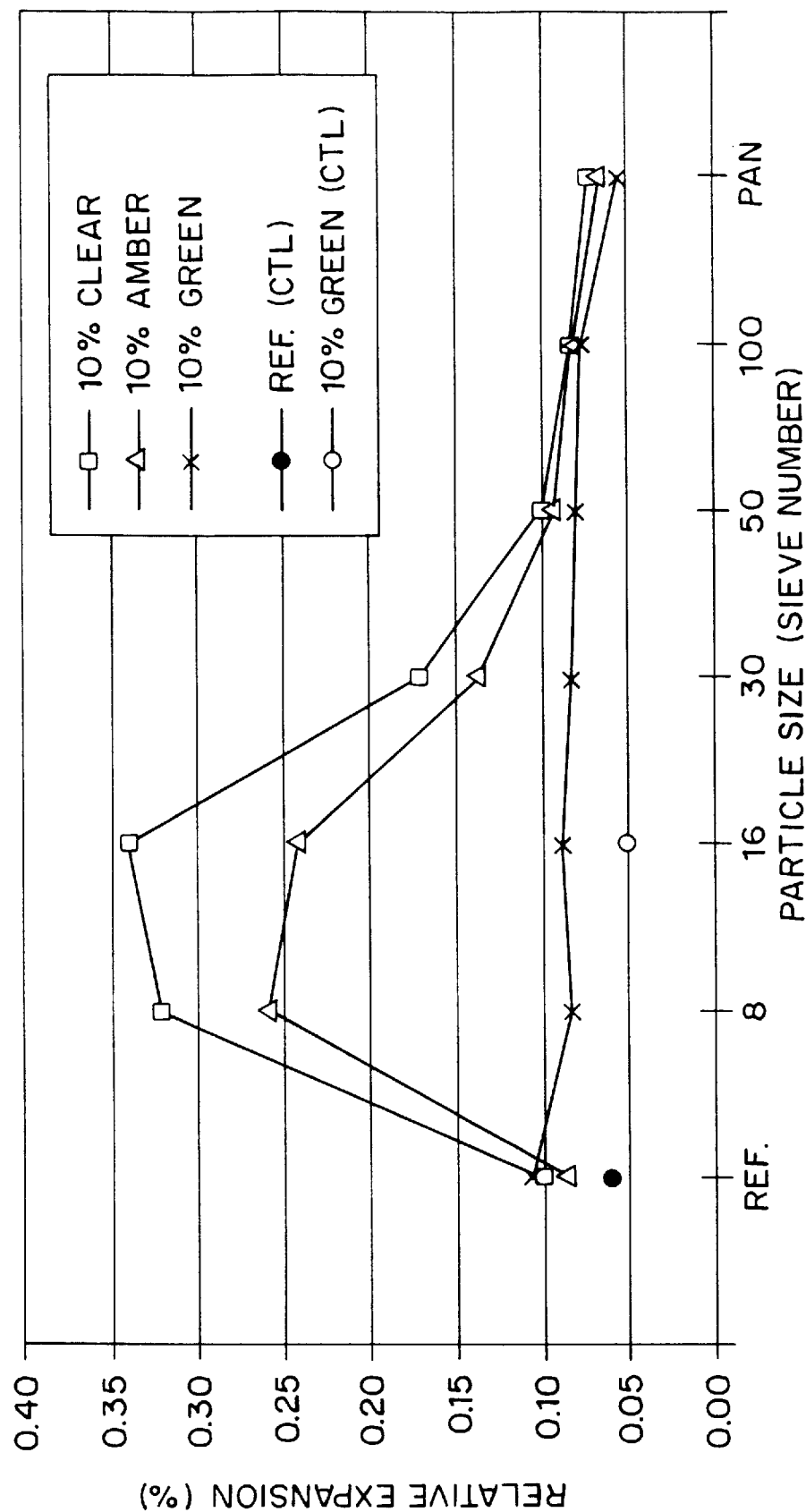
FIG. 1 depicts a graph of percent relative expansion versus particle size for mortar test bars comprising 10% by weight glass for glasses of various colors.

As used herein, descriptions of particle sizes in terms of sieve number mean that the particles are sufficiently fine not to pass through a particular sieve size but through the next larger sieve in the series #8, #16, #30, #50, #100, and #400 (e.g., #50 sieve particles would have a diameter less than about 300 $\mu$m). A minus sign prefix indicates that the particles are sufficiently fine to pass through the particular sieve size.

As used herein, the term "reactive aggregate" refers to a filler material which is dispersed in the cement matrix in a concrete article, and which causes a detrimental chemical reaction if no material is present to suppress the detrimental chemical reaction. The reactive aggregate may be a silica-containing reactive aggregate, but does not necessarily contain silica. If the reactive aggregate is a silica-containing reactive aggregate, ASR is typically the dominant detrimental chemical reaction. The term "reactive aggregate" does not include chromium glass particles.

As used herein, the term "set glass-concrete composition" refers to a material comprising a matrix of hydrated cement and chromium glass particles. Set glass-concrete compositions may also include reactive aggregates, nonreactive aggregates other than chromium glass particles and further ingredients.

As used herein, the term "detrimental chemical reaction" refers to a chemical reaction between a cement matrix and another ingredient in concrete which weakens the concrete. ASR is a type of detrimental chemical reaction which occurs when silica-containing reactive aggregate is used.

The present invention provides a set glass-concrete composition which resists detrimental chemical reactions and a method of making said composition. The composition comprises chromium glass particles dispersed in concrete. The chromium glass particles may be relatively coarsely ground (larger than #50 sieve), and may comprise a sufficient amount of chromium to suppress a detrimental chemical reaction between the concrete and the chromium glass particles. Alternatively, the chromium glass particles may be more finely ground (#50 sieve or finer), and may comprise a sufficient amount of chromium to suppress a detrimental chemical reaction between the concrete and a reactive aggregate. The detrimental chemical reaction may be ASR.

The chromium glass used to make the glass particles according to the invention may be formed, as described in the examples below, by grinding up ordinary chromium glass such as green bottle glass waste. Alternatively, chromium glass may be formed by melting a previously formed glass together with a chromium source such as chromium oxide at high temperature. Any material which is capable of mixing with molten glass and decomposing to form chromium oxide in the glass would be suitable for forming chromium glass. Chromium oxide ($Cr_2O_3$) is preferred simply because it is less costly than some other chromium source materials. In the following Examples, soda-lime glass modified to contain chromium and crushed green waste glass have been tested. However, many different types of chromium glasses are suitable for use in the present invention.

It has been discovered that if the chromium glass is ground to an average particle size of #50 sieve or finer, it will act to suppress detrimental chemical reactions, such as ASR, between cement and silica-containing reactive aggregate. (See FIG. 2). The finely ground ASR-suppressing chromium glass particles preferably comprise from 0.1% to 10%, and more preferably from 0.50% to 2% by weight of chromium oxide added to conventional glass such as soda-lime glass. (See FIG. 3). A typical ASR-resistant set glass-concrete composition having such fine chromium glass particles would comprise from about 0.5% to 20%, and more preferably more than 5% by weight chromium glass particles by weight of cement.

It has also been discovered that if chromium glass is ground to an average particle size greater than #50 sieve it will not, by itself, cause substantial ASR. (See FIG. 1). However, these larger chromium glass particles may not substantially reduce ASR between concrete and other reactive aggregate. The chromium glass particles having an average size greater than #50 sieve preferably comprise from 0.1% to 2.0% by weight of chromium oxide substituted into conventional soda-lime bottle glass.

A typical ASR-resistant set glass-concrete composition containing the above-described relatively large chromium glass particles may optionally further comprise reactive aggregate. Many typical aggregate materials which contain silica are prone to ASR. In such compositions, the amount of chromium glass particles comprises from about 0.5% to 100% by total weight of the aggregate and the chromium glass particles. More preferably, such compositions comprise a sufficient percentage of chromium glass particles such that they have an expansion value of less than 0.1% according to ASTM test C-1260 94.

The optimal amount of chromium in the glass is dependent on the size of particles of chromium glass to be added to the concrete as well as the composition of the concrete and the other ingredients in the glass. The chromium content and particle size and shape must be adjusted to achieve the desired results by preparing compositions having differing amounts of chromium, measuring the ASR which results from differing chromium levels, and adjusting the level to achieve the most desirable results. Alternatively, the type and amount of concrete and aggregate to be mixed with the chromium glass may be adjusted to be compatible with glass having a particular chromium content. Compositions having many different types and ratios of materials could be utilized without departing from the spirit or scope of the invention. A suitable test for measuring the degree of ASR is ASTM test C 1260-94, which is hereby incorporated by reference.

The chromium glass may be first used as a primary material for bottles and all other commercial glass applications before recycling the glass by grinding it into pieces suitable for incorporation in concrete. Glasses containing substantial amounts of chromium typically have a green color characteristic of chromium in a high oxidation state. The glass may be ground using conventional methods.

The concrete compositions according to the invention preferably comprise pieces of chromium glass and a suitable type of cement such as masonry cement, Portland cement, mixtures of masonry cement and Portland cement, and mixtures of the above with hydrated lime. The concrete composition may also contain conventional fillers such as gravel, sand, natural or manufactured aggregates or crushed stone. The filler may be any type of reactive concrete aggregate or a nonreactive concrete aggregate. The cement to aggregate weight ratio is typically between about 1:2.25 to about 1:8.

In a preferred embodiment of the invention, the glass-concrete composition comprises a suitable dry cement, an amount of water sufficient to fully hydrate the cement, and chromium glass particles as described above. A filler other than chromium glass particles may also be added. If the chromium glass particles are fibers, the typical percentage by weight of concrete is 0.5% to 10%. The chromium glass fibers preferably have a diameter of less than 0.5 mm, and therefore would be expected to act as an ASR suppressor for reactive aggregate. However, larger diameter fibers may also be used. The length of the chromium glass fibers typically averages from ½ inch to 1 inch.

The glass-concrete composition is typically formed by adding together the water, cement, optional filler and chromium glass particles and mixing them to form a composition having uniformly dispersed ingredients. The composition is then allowed to set.

EXAMPLE 1

Tests Demonstrating that ASR Varies Inversely with Glass Particle Size

ASTM test C 1260-94 was performed to determine the degree of ASR of compositions made according to the present invention. This test generally involves producing mortar test bars of specified composition which comprise a test material. The test bars are termed "mortar" test bars because the aggregate to be tested is ground finely to increase the surface area so that ASR may be observed in a compressed time. The results are predictive of the ASR which would occur in concrete over a longer time. The mortar test bars are placed in an aqueous sodium hydroxide solution, and their length expansion, which is indicative of the degree of ASR, is measured at precise times over sixteen days. ASTM test C 1260-94 specifies that expansion values less than 0.10% at sixteen days represent an innocuous degree of ASR, while expansion values greater than 0.20% represent a potentially deleterious degree of ASR. A control test sample containing 100% (weight percentage relative to the total weight of sand) Barrasso sand produced an expansion value of about 0.1%.

Barrasso sand used in these tests was obtained from Barrasso and Sons, West Islip, N.Y. Holnam low-alkali cement was used to make the test bars. The glass was ground to the following sizes: #8, #16, #30, #50, #100, #400 and Pan (i.e., dust). Each set of test bars contained 10% by weight glass of one of the sizes listed above.

FIG. 1 shows the values for percent relative expansion at day 16 of the test versus particle size for test bars prepared using glass of three different colors. FIG. 1 also shows two data points reported by Construction Technology Laboratory of Skokie, Ill. (hereinafter "CTL"), an independent laboratory which ran the ASTM C 1260-94 procedure by preparing reference test bars (100% Barrasso sand) and test bars containing 10% green glass of size #16 (i.e., chromium glass) using materials supplied by the inventors. It is apparent from FIG. 1 that the chromium glass, unlike the other tested glasses, avoids ASR even when ground to relatively coarse sizes. The results also show that acceptable levels of ASR are observed throughout the tests for all three colors of glass ground to a size #50 sieve or finer.

EXAMPLE 2

Tests Demonstrating That Chromium Glass Powder Is An Effective ASR Suppressant

Further tests were performed using ASTM test C 1260-94 to determine the effectiveness of various ASR suppressant materials. Specifically, Metakaolin, lithium hydroxide, and finely ground green glass were tested. Metakaolin and lithium hydroxide are inferior to ASR suppressants compared with chromium glass because they are more expensive and do not typically use recycled materials.

All tests described below were performed using 90% Blue Circle nonreactive aggregate (sand) mined at Blue Circle Co.'s Hamburg, N.J. quarry and 10% #16 clear glass (reactive aggregate) together with the ASR suppressant test material. A reactive reference was prepared using the above ingredients without an ASR suppressant test material. A nonreactive reference was prepared by excluding both the ASR suppressant and the #16 clear glass. The compositions tested are summarized in Table I below.

The $Cr_2O_3$ glasses listed in Table I were formed by melting soda-lime glass at about 2400° in the presence of appropriate amounts of chromium oxide followed by slow cooling. Specifically, the mixtures were placed in a one liter mullite crucible and heated in an electric furnace under oxidizing conditions (i.e. vented to air). The temperature was held at maximum for about 2 hours before the furnace was allowed to cool back to room temperature. After the furnace cooled, the crucible was removed from the furnace and broken off the glass, which remained in a single lump. Any remaining crucible material was ground off the surface with a silicon carbide grinding wheel.

Figure 2:
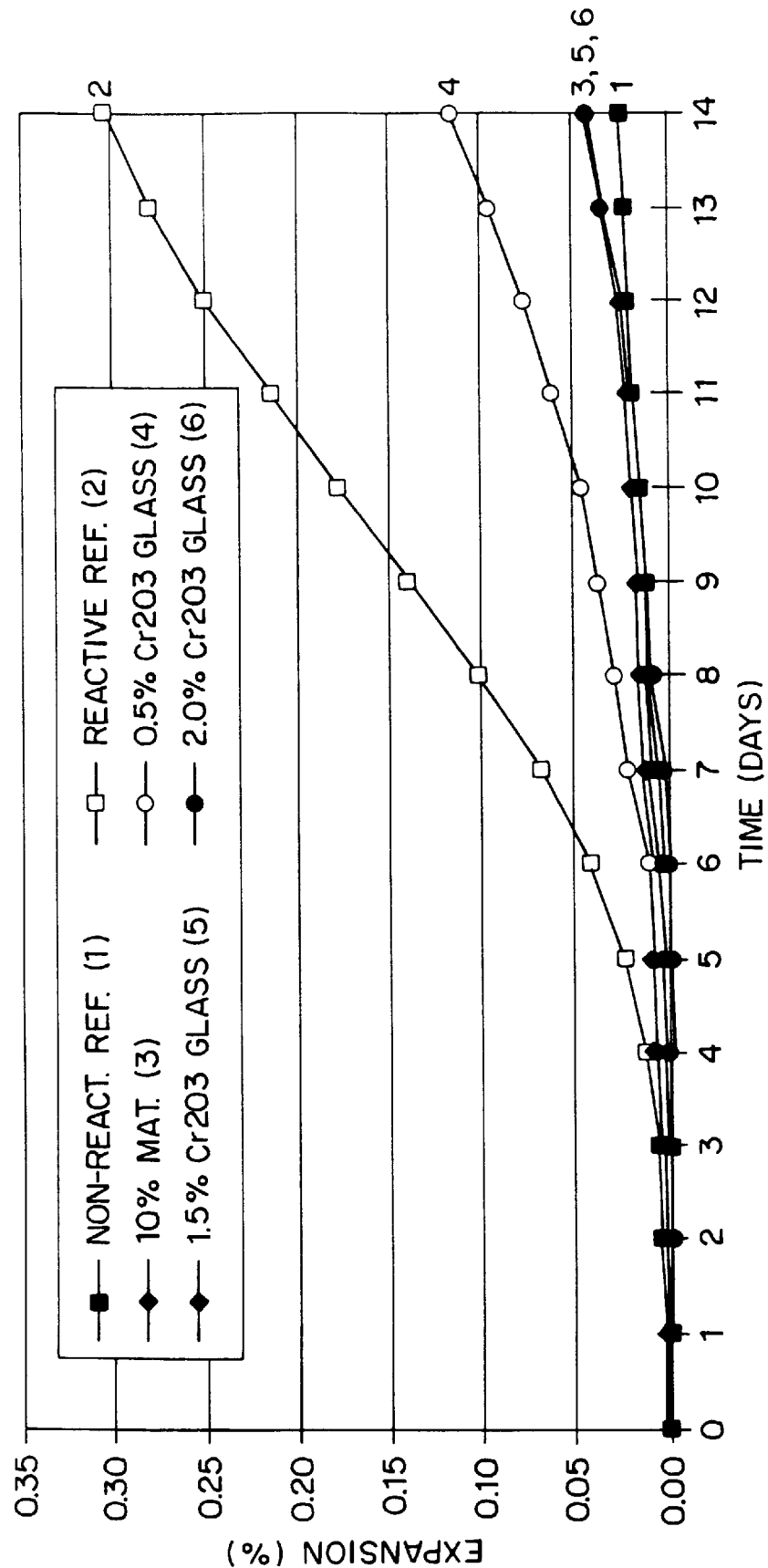
FIG. 2 depicts a graph of percent relative expansion versus time for mortar test bars comprising various ASR suppressing materials.

The test results showing suppression of ASR for the compositions listed in Table I are shown in FIG. 2. The results show that finely ground glass containing chromium suppresses ASR between concrete and the aggregate and/or clear glass.

Figure 3:
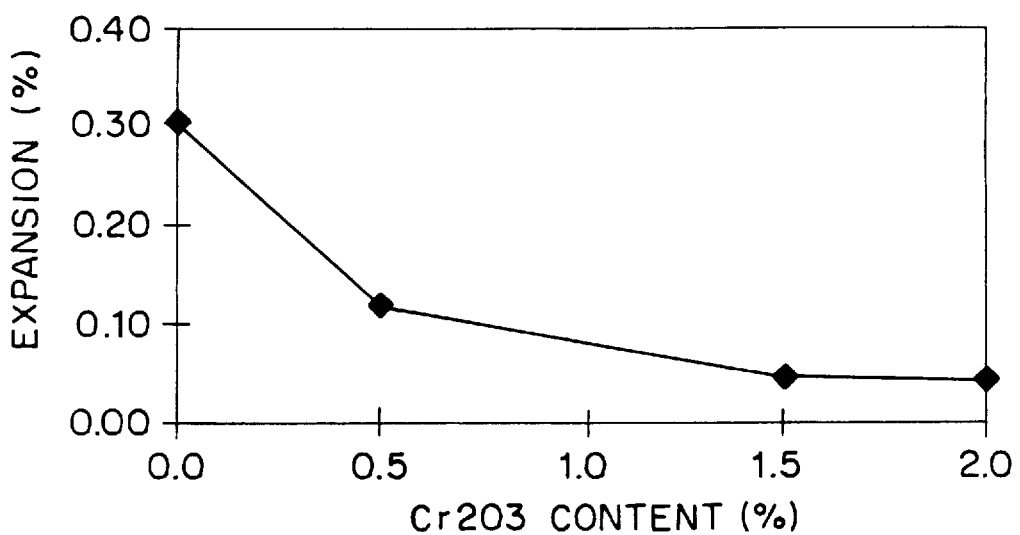
FIG. 3 depicts a graph of percent relative expansion versus percent $Cr_2O_3$ content.

FIG. 3 depicts the percent expansion versus $Cr_2O_3$ content of the glass powder in mortar test bars prepared as described above. FIG. 3 shows that a $Cr_2O_3$ content of greater than 0.5% is necessary to effectively suppress ASR.

PROPHETIC EXAMPLE 3

Prophetic Example Demonstrating A Reinforced Concrete Composition Containing Chromium Glass Fibers A 1.5% chromium oxide substituted glass is prepared as described above in Example 1. This chromium glass is made into fiberglass via heating and drawing fibers by hand. The fibers have an average length of ¾ inch and an average diameter of 10–40 microns. The fiberglass reinforced concrete is prepared by mixing together the following:

440 g Portland cement 990 g Blue Circle aggregate sand graded as described in ASTM test C 1260-94

16 g chromium oxide substituted fiberglass 206.8 g water.

The above mixture is allowed to set. The reinforced concrete produced is thought to have improved mechanical properties compared with an analogous glass fiber-reinforced concrete using conventional soda-lime fiberglass because conventional soda-lime fiberglass reacts with the cement. However, the chromium fiberglass does not undergo ASR.

Although the present invention has been described in considerable detail with reference to certain preferred versions thereof, other versions are possible. For example,

TABLE I

Summary of mortar bar mix

| No. | Description | Aggregate *(Remainder is Blue Circle Sand) | Binder **(Remainder is Holnam Cement) | Comments |
| --- | --- | --- | --- | --- |
| 1 | Non-reactive reference | 100% Blue Circle Sand | 100% Holnam Cement | cement substitution |
| 2 | Reactive reference | 10% #16 clear glass* | 100% Holnam Cement | cement substitution |
| 3 | 10% Metakaol in sub. | 10% #16 clear glass* | 10% Metakaolin** | cement substitution |
| 4 | 0.5% chrome in glass | 10% #16 clear glass* | 10% –#400 green glass (0.5% $Cr_2O_3$)** | cement substitution |
| 5 | 1.5% chrome in glass | 10% #16 clear glass* | 10% –#400 green glass (1.5% $Cr_2O_3$)** | cement substitution |
| 6 | 2.0% chrome in glass | 10% #16 clear glass* | 10% –#400 green glass (2.0% $Cr_2O_3$)** | cement substitution | different types of cements and glasses could be tested by preparing samples generally by using the above procedure. For instance, various different glasses containing chromium could be tested by preparing concrete compositions as described above and using ASTM test C 1260-94 to determine if ASR is reduced or avoided. Therefore, the spirit and scope of the appended claims should not be limited to the description of the preferred versions contained herein.

We claim:

1. A set glass-concrete composition which comprises chromium glass particles and reactive aggregate dispersed in hydrated cement, wherein said chromium glass particles have a green color and have an average diameter of less than 0.5 mm and comprise a sufficient amount of chromium to suppress a detrimental chemical reaction between the hydrated cement and the reactive aggregate, wherein the chromium glass particles do not contain an amount of zirconium which is sufficient to impart enhanced alkali resistant properties to the chromium glass particles.

2. A set glass-concrete composition which comprises chromium glass particles dispersed in hydrated cement, wherein said chromium glass particles have a green color and have an average diameter of greater than 0.5 mm and comprise a sufficient amount of chromium to suppress a detrimental chemical reaction between the hydrated cement and the chromium glass particles, wherein the chromium glass particles do not contain an amount of zirconium which is sufficient to impart enhanced alkali resistant properties to the chromium glass particles.

3. A set glass-concrete composition according to claim 1, wherein the reactive aggregate comprises silica, and the detrimental chemical reaction is an alkali silica reaction.

4. A set glass-concrete composition according to claim 2, wherein the detrimental chemical reaction is an alkali silica reaction.

5. A set glass-concrete composition according to claim 3, wherein the chromium glass particles contain trace amounts of zirconium.

6. A set glass-concrete composition according to claim 4, wherein the chromium glass particles contain trace amounts of zirconium.

7. A set glass-concrete composition according to claim 3, wherein the chromium glass particles are fibers.

8. A set glass-concrete composition according to claim 4, wherein the chromium glass particles are fibers.

9. A set glass-concrete composition according to claim 2, wherein the chromium glass particles comprise soda-lime glass comprising from 0.1% to 2.0% by weight of chromium oxide.

10. A set glass-concrete composition according to claim 1, wherein the chromium glass particles comprise soda-lime glass comprising from 0.1% to 2.0% by weight of chromium oxide.

11. A set glass-concrete composition according to claim 3, wherein the composition comprises from 0.5% by weight to 20% by weight chromium glass particles by total weight of cement.

12. A set glass-concrete composition according to claim 4, wherein the combination of reactive aggregate and chromium glass particles comprises from 0.5% by weight to 100% by weight chromium glass particles.

13. A process for making a set glass-concrete composition which comprises mixing dry cement, water, a reactive aggregate and chromium glass particles having a green color and having an average diameter of less than 0.5 mm and comprising a sufficient amount of chromium to suppress a detrimental chemical reaction between the cement and the reactive aggregate, wherein the chromium glass particles do not contain an amount of zirconium which is sufficient to impart enhanced alkali resistant properties to the chromium glass particles.

14. A process for making a set glass-concrete composition which comprises mixing dry cement, water, and chromium glass particles having a green color and having an average diameter of greater than 0.5 mm and comprising a sufficient amount of chromium effective to suppress a detrimental chemical reaction between the cement and the chromium glass particles, wherein the chromium glass particles do not contain an amount of zirconium which is sufficient to impart enhanced alkali resistant properties to the chromium glass particles.

15. A process according to claim 13, wherein the reactive aggregate comprises silica, and the reaction is an alkali silica reaction.

16. A process according to claim 14, wherein the reaction is an alkali silica reaction.

17. A process according to claim 16, wherein the chromium glass particles comprise soda-lime glass comprising from 0.1% to 2.0% by weight of chromium oxide.

18. A set glass-concrete composition according to claim 13, wherein the chromium glass particles comprise soda-lime glass comprising from 0.1% to 2.0% by weight of chromium oxide.

19. A process according to claim 15, wherein the chromium glass particles are fibres.

20. A process according to claim 16, wherein the chromium glass particles are fibres.

21. The set glass-concrete composition provided by the process according to claim 13.

22. The set glass-concrete composition provided by the process according to claim 14.

23. A set glass-concrete composition according to claim 21, wherein the chromium glass particles are fibers.

24. A set glass-concrete composition according to claim 22, wherein the chromium glass particles are fibers.

* * * * *